US012617475B2

(12) United States Patent
Kang et al.

(10) Patent No.: US 12,617,475 B2
(45) Date of Patent: May 5, 2026

(54) VEHICLE BODY REAR STRUCTURE

(71) Applicants: Hyundai Motor Company, Seoul (KR); Kia Corporation, Seoul (KR)

(72) Inventors: Chang Hak Kang, Hwaseong-si (KR); Chan Woong Jeon, Incheon (KR); Sang Kyoung Han, Gunpo-si (KR); HaeHoon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 352 days.

(21) Appl. No.: 18/460,825

(22) Filed: Sep. 5, 2023

(65) Prior Publication Data

US 2024/0190517 A1     Jun. 13, 2024

(30) Foreign Application Priority Data

Dec. 13, 2022     (KR) ........................ 10-2022-0173931

(51) Int. Cl.
| | |
|---|---|
| *B62D 25/20* | (2006.01) |
| *B62D 25/02* | (2006.01) |
| *B62D 25/16* | (2006.01) |
| *B62D 27/02* | (2006.01) |

(52) U.S. Cl.
CPC ....... *B62D 25/2036* (2013.01); *B62D 25/025* (2013.01); *B62D 25/16* (2013.01); *B62D 27/023* (2013.01)

(58) Field of Classification Search
CPC .. B62D 25/025; B62D 25/16; B62D 25/2036; B62D 27/023
See application file for complete search history.

(56) References Cited

U.S. PATENT DOCUMENTS

| | | | | |
|---|---|---|---|---|
| 4,392,684 A | * | 7/1983 | Yoshitsugu | ........ B62D 25/2027 |
| | | | | 296/203.03 |
| 2017/0073020 A1 | * | 3/2017 | Ayuzawa | .................. B32B 1/00 |

FOREIGN PATENT DOCUMENTS

| | | | | |
|---|---|---|---|---|
| CN | 114954682 A | * | 8/2022 | ............. B62D 25/18 |

\* cited by examiner

*Primary Examiner* — Dany E Akakpo
(74) *Attorney, Agent, or Firm* — Slater Matsil, LLP

(57) ABSTRACT

An embodiment rear structure for a vehicle body includes a rear floor panel and a rear floor side member mounted on both sides of an upper portion of the rear floor panel along a length direction of the vehicle body and defining a side closed section together with the rear floor panel.

20 Claims, 11 Drawing Sheets

<u>10</u>

VEHICLE BODY REAR STRUCTURE

CROSS-REFERENCE TO RELATED APPLICATIONS

This application claims the benefit of Korean Patent Application No. 10-2022-0173931, filed on Dec. 13, 2022, which application is hereby incorporated herein by reference.

TECHNICAL FIELD

The present invention relates to a vehicle body rear structure.

BACKGROUND

Generally, a rear floor side member is disposed under the rear floor, and the rear floor side member plays a major role in the crash and strength of the vehicle.

In general, seats and cargo are mounted on the upper part of the rear floor, and additional parts are required to be mounted.

Recently, the demand for environment-friendly vehicles such as electric vehicles and hydrogen vehicles is increasing, and research on autonomous vehicles is expanding. Parts necessary for such an environment-friendly and/or autonomous driving vehicle, such as high-weight materials (HPC) or parts that may be sensitive to vibration, for example, autonomous driving control equipment, and parts that are vibration sources (compressor of sensor cleaner) or water pump, etc. are mounted on the rear floor.

However, since the rear floor side member is disposed under the rear floor, the height of the rear floor side member is limited, which causes a problem in that the strength of the rear floor side member is insufficient.

That is, interference with lower chassis parts occurs in terms of the body on frame characteristic, and in order to avoid this, the cross-section of the rear floor side member, particularly the height direction of the cross-section, is limited. In order to secure the cross-section of the height direction of the rear floor side member, the cargo loading space must be reduced.

In addition, in the case of a rear collision of a vehicle, damage to autonomous driving equipment may occur due to the insufficient strength of rear floor side members, and in the floor structure of a delivery vehicle, the engagement robustness of autonomous driving parts that are relatively sensitive to vibration/collision may be insufficient.

The above information disclosed in this background section is only for enhancement of understanding of the background of embodiments of the invention, and therefore it may contain information that does not form the prior art that is already known to a person of ordinary skill in the art.

SUMMARY

The present invention relates to a vehicle body rear structure. Particular embodiments relate to a vehicle body rear structure capable of enhancing collision response performance at the rear of the vehicle body and securing an indoor space behind the vehicle body.

Embodiments of the present disclosure provide a vehicle body rear structure capable of enhancing crash response performance at the rear of the vehicle body and securing an indoor space at the rear of the vehicle body.

A vehicle body rear structure according to an exemplary embodiment of the present invention may include a rear floor panel and a rear floor side member mounted on both sides of an upper portion of the rear floor panel along the length direction of the vehicle body and forming a side closed section together with the rear floor panel.

The vehicle body rear structure according to an exemplary embodiment of the present invention may further include a back panel connected with the rear of the rear floor side member.

The vehicle body rear structure according to an exemplary embodiment of the present invention may further include a chamfer formed at the rear of the rear floor panel toward the inside of the vehicle body and a side member rear flange formed at the rear of the rear floor side member, and the chamfer, the side member rear flange, and the back panel may be integrally welded.

The vehicle body rear structure according to an exemplary embodiment of the present invention may further include a cross member disposed in the width direction of the vehicle body and connected with the front of the rear floor side member.

The vehicle body rear structure according to an exemplary embodiment of the present invention may further include a center floor panel, a part of which is inserted between the cross member and the rear floor panel.

The cross member may include a cross lower flange and a cross upper flange connected to the center floor panel, and the cross member and the center floor panel may form a cross closed section between the cross lower flange and the cross upper flange.

The rear floor panel may include a rear floor front flange formed to be welded integrally with the cross lower flange and the center floor panel at the front portion corresponding to the cross lower flange.

The rear floor panel may further include a rear floor bent portion bent toward the cross lower flange.

The rear floor side member may include a side member front flange formed to be integrally welded with the cross upper flange and the center floor panel at a position corresponding to the cross upper flange at the front portion thereof.

The floor side member may further include a rear side member bent portion bent toward the cross upper flange.

The vehicle body rear structure according to an exemplary embodiment of the present invention may further include a rear wheel arch member connected to an end of the cross member and provided on both sides of the vehicle body, respectively.

The vehicle body rear structure according to an exemplary embodiment of the present invention may further include a side sill connected to the front of the rear wheel arch member and the center floor panel and provided on both sides of the vehicle body, respectively.

According to the vehicle body rear structure according to an exemplary embodiment, crash response performance at the rear of the vehicle body may be enhanced and an indoor space at the rear of the vehicle body may be secured.

According to the vehicle body rear structure according to an exemplary embodiment, a rear floor side member may be used as a configuration for mounting parts at the rear of the vehicle body.

In addition, effects that can be obtained or predicted due to the embodiments of the present invention will be directly or implicitly disclosed in the detailed description of the embodiments of the present invention. That is, various effects expected according to embodiments of the present invention will be disclosed within the detailed description to be described later.

BRIEF DESCRIPTION OF THE DRAWINGS

Since these drawings are for reference in explaining exemplary embodiments of the present invention, the technical idea of the present invention should not be construed as limited to the accompanying drawings.

Figure 1:
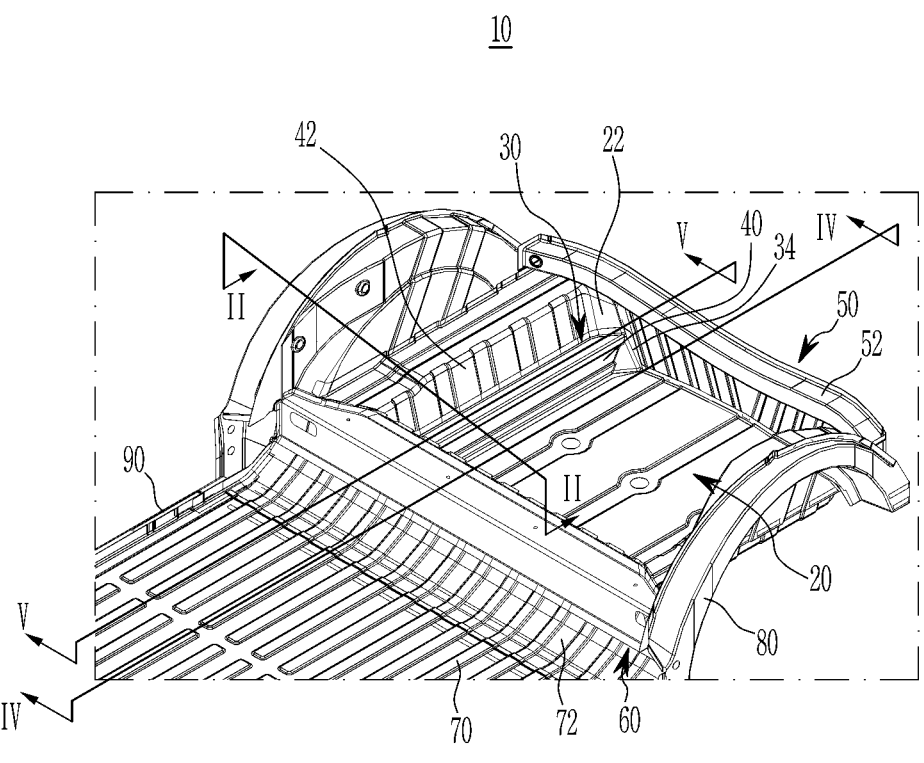
FIG. 1 is a partial perspective view of a vehicle body rear structure according to an exemplary embodiment of the present invention.

The following reference identifiers may be used in connection with the drawings to describe various features of embodiments of the present invention.

| | |
|---|---|
| 10: vehicle body | 20: rear floor panel |
| 22: chamfer | 24: rear floor front flange |
| 26: rear floor bent portion | 28: rear floor side flange |
| 30: rear floor side member | 32: side bent reinforcement |
| 34: side member rear flange | 36: side member front flange |
| 37: side member inner flange | 38: rear side member bent portion |
| 40: side member lower flange | 42: side member upper flange |
| 50: back panel | 52: back panel cross member |
| 60: cross member | 62: cross lower flange |
| 64: cross upper flange | 66: cross member end flange |
| 70: center floor panel | 72: center floor panel bent portion |
| 80: rear wheel arch member | 90: side sill |
| 100: rear mount parts | 102: mount bolt |
| 110: vehicle body lower configuration | SC: side closed section |
| CC: cross closed section | |

DETAILED DESCRIPTION OF ILLUSTRATIVE EMBODIMENTS

Hereinafter, with reference to the accompanying drawings, embodiments of the present invention will be described in detail so that those skilled in the art can easily carry out embodiments of the present invention. As those skilled in the art would realize, the described embodiments may be modified in various different ways, all without departing from the spirit or scope of the present invention.

In order to clearly describe embodiments of the present invention, parts irrelevant to the description are omitted, and the same reference numerals are assigned to the same or similar components throughout the specification.

Since the size and thickness of each component shown in the drawings are arbitrarily shown for convenience of description, embodiments of the present invention are not necessarily limited to those shown in the drawings, and the thickness is enlarged to clearly express various parts and regions.

Throughout the specification, when a part includes a certain component, this means that it may further include other components without excluding other components unless otherwise stated.

In addition, terms such as "part" and "means" described in the specification mean a comprehensive unit of configuration that performs at least one function or operation.

When a part such as a layer, film, region, plate, etc. is said to be "on" another part, this includes not only the case of being directly on the other part, but also the case where there is another part in between.

In contrast, when an element is referred to as being "directly on" another element, there are no intervening elements present.

As used herein, 'vehicle', 'vehicular', 'automotive' or other similar terms as used herein generally refer to passenger vehicles, sports cars, sport utility vehicles (SUVs), buses, trucks, and various commercial vehicles including passenger automobiles, hybrid vehicles, electric vehicles, hybrid electric vehicles, electric vehicle-based PBVs (purpose built vehicles), hydrogen-powered vehicles, and other alternative fuel vehicles (e.g., other than petroleum fuel derived from resources).

Exemplary embodiments will hereinafter be described in detail with reference to the accompanying drawings.

Figure 2:
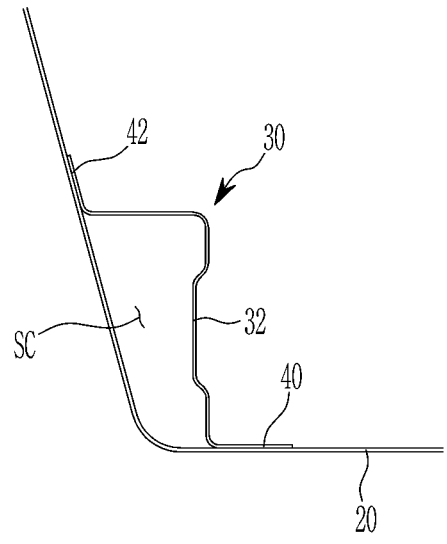
FIG. 2 is a cross-sectional view along line II-II of FIG. 1.

FIG. 1 is a partial perspective view of a vehicle body rear structure according to an exemplary embodiment of the present invention, and FIG. 2 is a cross-sectional view along line II-II of FIG. 1.

Referring to FIG. 1 and FIG. 2, the vehicle body rear structure according to an exemplary embodiment of the present invention may include a rear floor panel 20 mounted on the rear of the vehicle body 10 and a rear floor side member 30 mounted on both sides of an upper portion of the rear floor panel 20 along the length direction of the vehicle body and forming a side closed section SC together with the rear floor panel 20.

That is, in the vehicle body rear structure according to an exemplary embodiment, since the rear floor side member 30 is mounted on the upper portion of the rear floor panel 20, limitations on interference with lower mounting structures of the vehicle body 10, for example, chassis parts such as frames or suspension systems, may be reduced. Therefore, the mount position of the rear floor panel 20 may be relatively lowered.

In addition, the rear floor side member 30 is mounted on the upper portion of the rear floor panel 20, and the cross-section shape of the rear floor side member 30 may be varied, thereby enhancing crash response performance at the rear of the vehicle body, and it is possible to secure the interior space in the rear.

The rear floor side member 30 may include a side member lower flange 40 and a side member upper flange 42 and may be coupled to the rear floor panel 20 through the side member lower flange 40 and the side member upper flange 42. For example, the side member lower flange 40 and the side member upper flange 42 may be coupled to the rear floor panel 20 by welding, respectively.

The rear floor side member 30 may include a side bent reinforcement 32 formed in the length direction of the vehicle body 10.

The side bent reinforcement 32 is formed in the length direction of the vehicle body 10 to secure more strength against collision in case of a rear collision of the vehicle.

The vehicle body strength may be secured by increasing the length direction cross-section coefficient (section modulus) of the vehicle body 10 by the side closed section SC formed by the rear floor side member 30, and the vehicle body strength may be further increased by the shape of the side bent reinforcement 32. In addition, by the curved shape of the side member lower flange 40 and the side member upper flange 42, welding connection with the rear floor panel 20 may increase the length direction strength of the vehicle body 10.

Figure 3:
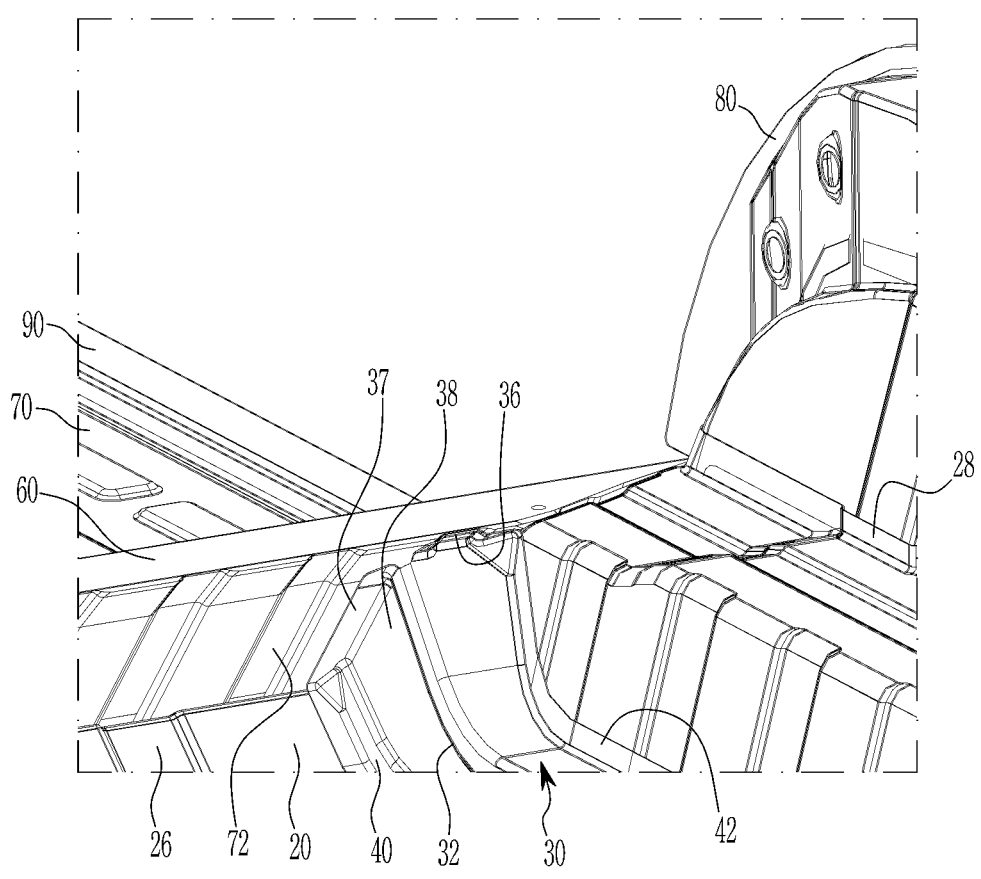
FIG. 3 is a perspective view of a front part of a rear floor side member of a vehicle body rear structure according to an exemplary embodiment of the present invention.
Figure 4:
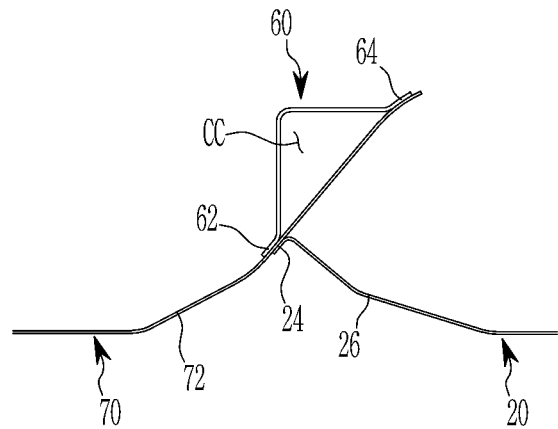
FIG. 4 is a cross-sectional view along line IV-IV in FIG. 1.

FIG. 3 is a perspective view of a front part of a rear floor side member of a vehicle body rear structure according to an exemplary embodiment of the present invention, and FIG. 4 is a cross-sectional view along line IV-IV in FIG. 1.

Figure 5:
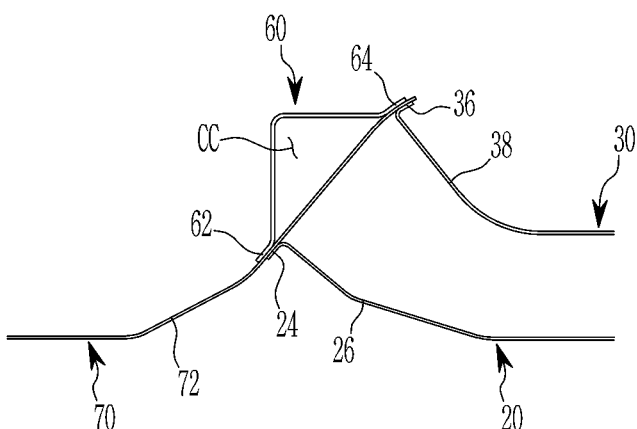
FIG. 5 is a cross-sectional view along line V-V in FIG. 1.
Figure 6:
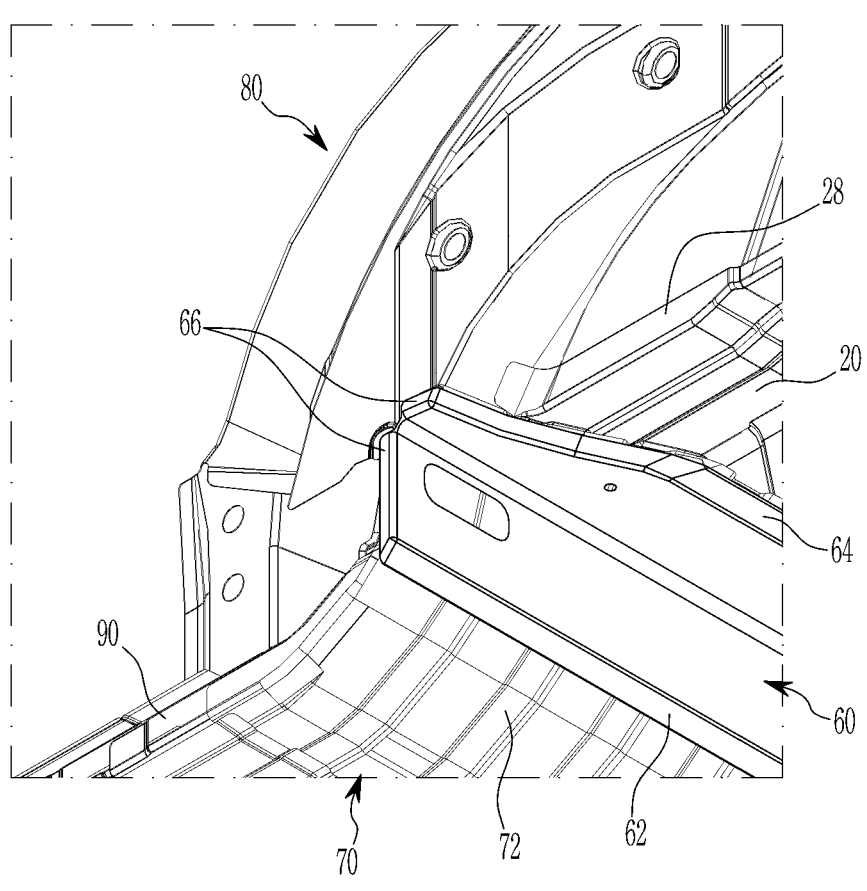
FIG. 6 is a partial perspective view of a cross member of a vehicle body rear structure according to an exemplary embodiment of the present invention.

FIG. 5 is a cross-sectional view along line V-V in FIG. 1, and FIG. 6 is a partial perspective view of a cross member of a vehicle body rear structure according to an exemplary embodiment of the present invention.

Referring to FIG. 1 to FIG. 6, the vehicle body rear structure according to an exemplary embodiment may further include a cross member 60 disposed in the width direction of the vehicle body 10 and connected to the front of the rear floor side member 30.

The cross member 60 increases the width direction strength of the vehicle body 10 and is connected to the front of the rear floor side member 30 so as to distribute the rear impact load to the width direction and front direction of the vehicle body 10 in the event of a rear collision of the vehicle.

The vehicle body rear structure according to an exemplary embodiment may further include a center floor panel 70, a part of which is inserted between the cross member 60 and the rear floor panel 20.

As the center floor panel 70 is inserted and coupled between the cross member 60 and the rear floor panel 20, the center floor panel 70 and the rear floor panel 20 are connected without being disconnected. Therefore, the length direction strength of the vehicle body 10 may be increased.

The cross member 60 includes a cross lower flange 62 and a cross upper flange 64 connected to the center floor panel 70, and the cross member 60 and the center floor panel 70 may form a cross closed section CC between the cross lower flange 62 and the cross upper flange 64.

The cross lower flange 62 and the cross upper flange 64 may be connected to the center floor panel 70 by welding.

The cross closed section CC may secure the strength of the vehicle body 10 by increasing the width direction cross-section coefficient of the vehicle body 10.

An "L" shaped cross-section may be formed between the cross lower flange 62 and the cross upper flange 64 of the cross member 60. The "L" shaped cross-section shape may increase the width direction strength of the vehicle body 10.

The rear floor panel 20 may include a rear floor front flange 24 integrally welded to the cross lower flange 62 and the center floor panel 70 at a position corresponding to the cross lower flange 62 at a front portion thereof.

The rear floor front flange 24, the cross lower flange 62, and the center floor panel 70 are integrally welded to reduce the number of assembly processes of the vehicle body 10, and when a vehicle collides, the impact load transmitted from the rear floor panel 20 may be distributed to the width direction and length direction of the vehicle body 10 through the cross member 60 and the center floor panel 70.

The rear floor panel 20 may further include a rear floor bent portion 26 bent toward the cross lower flange 62.

The rear floor bent portion 26 facilitates welding work with the center floor panel 70 and the cross lower flange 62 and may reinforce the connection between the center floor panel 70 and the rear floor panel 20. In addition, the shape of the rear floor bent portion 26 may increase width direction strength of the vehicle body 10. For example, the rear floor bent portion 26 may be bent toward the upper portion of the vehicle body 10 in a 'J' shape.

The rear floor side member 30 may include a side member front flange 36 integrally welded to the cross upper flange 64 and the center floor panel 70 at a position corresponding to the cross upper flange 64 at a front portion thereof.

The cross upper flange 64, the center floor panel 70, and the side member front flange 36 are integrally welded to reduce the number of assembly processes of the vehicle body 10, and when a vehicle collides, the impact load transmitted from the rear floor side member 30 may be distributed to the width direction and length direction of the vehicle body 10 through the cross member 60 and the center floor panel 70.

The rear floor side member 30 may further include a rear side member bent portion 38 bent toward the cross upper flange 64.

The rear side member bent portion 38 facilitates welding work with the center floor panel 70 and the cross upper flange 64 and may reinforce the connection between the center floor panel 70 and the rear floor side member 30. In addition, the shape of the rear side member bent portion 38 may increase the width direction strength of the vehicle body 10. For example, the rear side member bent portion 38 may be bent toward the upper portion of the vehicle body 10 in a 'J' shape.

A center floor panel bent portion 72 is formed to the rear part of the center floor panel 70 and may be connected to the rear floor panel 20, the rear floor side member 30, and the cross member 60.

The curved shape of the center floor panel bent portion 72 facilitates welding work with the rear floor panel 20 and the rear floor side member 30, and the center floor panel bent portion 72 may be combined with the rear floor panel 20 and the rear floor side member 30 without a significant change in cross-section, thereby enhancing the strength of the vehicle body 10. For example, the center floor panel bent portion 72 may be bent toward the upper portion of the vehicle body 10 in a 'J' shape.

Also, referring to FIG. 3, the rear floor side member 30 has a side member inner flange 37 connected to the center floor panel bent portion 72 of the center floor panel 70 at the front thereof, thereby increasing the bonding force with the center floor panel 70.

Figure 7:
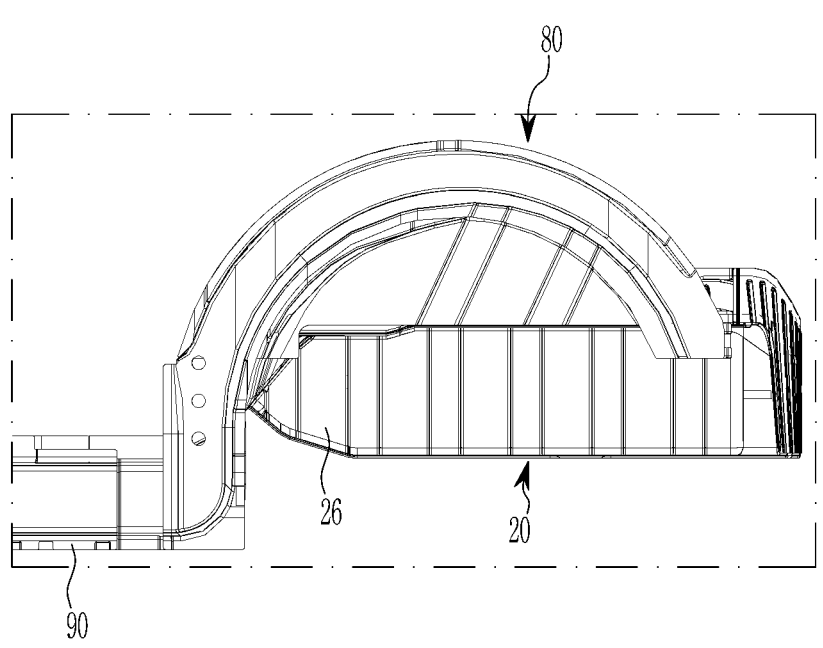
FIG. 7 is a partial side view showing a rear wheel arch member of a vehicle body rear structure according to an exemplary embodiment of the present invention.

FIG. 7 is a partial side view showing a rear wheel arch member of a vehicle body rear structure according to an exemplary embodiment of the present invention.

The vehicle body rear structure according to an exemplary embodiment may further include a rear wheel arch member 80 connected to ends of the cross member 60 and provided on both sides of the vehicle body, respectively.

Referring to FIG. 6 and FIG. 7, a cross member end flange 66 may be bent at an end of the cross member 60 and connected to the rear wheel arch member 80 by welding. Through this, connectivity in the width direction of the vehicle body 10 may be improved. In addition, loads transmitted from the rear floor panel 20 and the rear floor side member 30 may be distributed to the rear wheel arch member 80 through the cross member 60.

As shown in FIG. 6, a rear floor side flange 28 is bent at an end in the width direction of the rear floor panel 20 and may be connected to the rear wheel arch member 80. The rear floor side flange 28 may increase the width direction connectivity and strength of the vehicle body 10.

Figure 8:
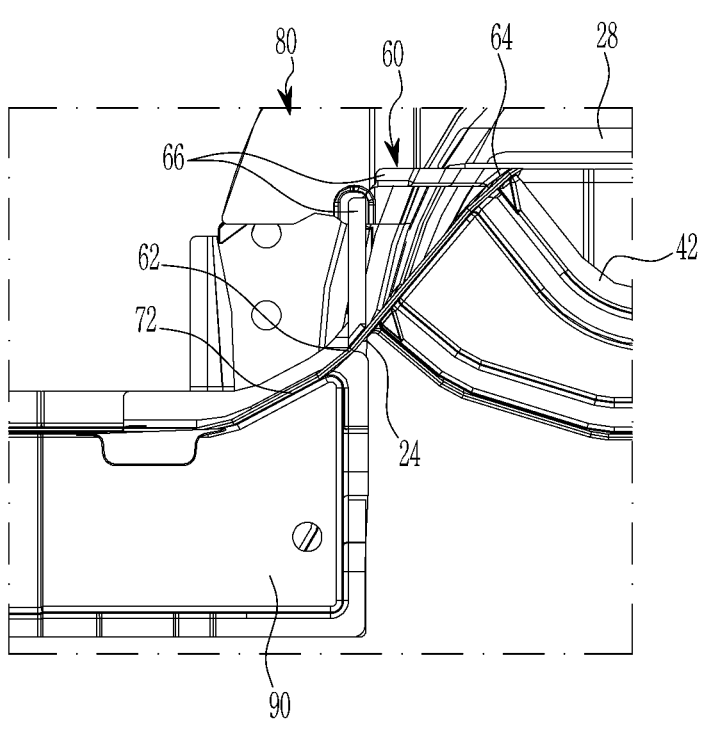
FIG. 8 is a partial side view showing a side sill of a vehicle body rear structure according to an exemplary embodiment of the present invention.

FIG. 8 is a partial side view showing a side sill of a vehicle body rear structure according to an exemplary embodiment of the present invention.

Referring to FIG. 6 to FIG. 8, the vehicle body rear structure according to an exemplary embodiment may further include side sills 90 connected to the center floor panel 70 and the front of the rear wheel arch member 80 and provided on both sides of the vehicle body.

The rear floor panel 20, the rear floor side member 30, the cross member 60, the center floor panel 70, the rear wheel arch member 80, and the side sill 90 are directly or indirectly connected to secure vehicle strength and it is possible to distribute the impact load in the length direction and width direction of the vehicle body 10.

Figure 9:
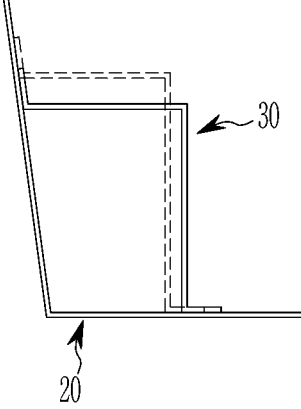
FIG. 9 is a drawing showing a vehicle body rear structure according to an exemplary variation of the present invention.

FIG. 9 is a drawing showing a vehicle body rear structure according to an exemplary variation of the present invention.

As shown in FIG. 9, the size, thickness, and shape of the rear floor side member 30, for example, the height and/or the length in the width direction, depend on the size of the vehicle body 10, the material of the rear floor side member 30, and the vehicle body 10. It may be designed in various ways considering the size, weight, etc. of cargo or parts mounted on it.

That is, in the vehicle body rear structure according to an exemplary embodiment, restrictions on interference with chassis parts such as a frame or a suspension system are reduced, and the design degree of freedom of the rear floor side member 30 may be increased.

Figure 10:
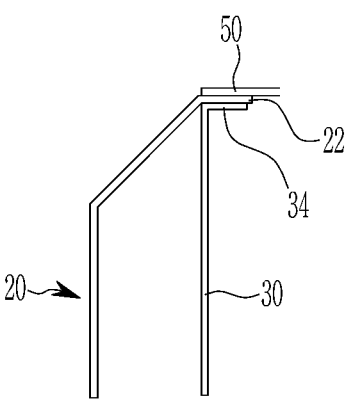
FIG. 10 is a drawing showing a connection of a back panel of a vehicle body rear structure according to an exemplary embodiment of the present invention.

FIG. 10 is a drawing showing a connection of a back panel of a vehicle body rear structure according to an exemplary embodiment of the present invention.

Referring to FIG. 1 and FIG. 10, the vehicle body rear structure according to an exemplary embodiment may further include a back panel 50 connected to the rear of the rear floor side member 30.

A chamfer 22 is formed at the rear of the rear floor panel 20 toward the inside of the vehicle body 10, and a side member rear flange 34 is formed at the rear of the rear floor side member 30. And the chamfer 22, the side member rear flange 34, and the back panel 50 may be integrally welded together.

Accordingly, the assembly process of the rear floor panel 20, the rear floor side member 30 and the back panel 50 is simplified, and the bonding strength with the back panel 50 may be increased.

A back panel cross member 52 is connected to the upper portion of the back panel 50 to increase the width direction strength of the rear of the vehicle body 10.

Figure 11:
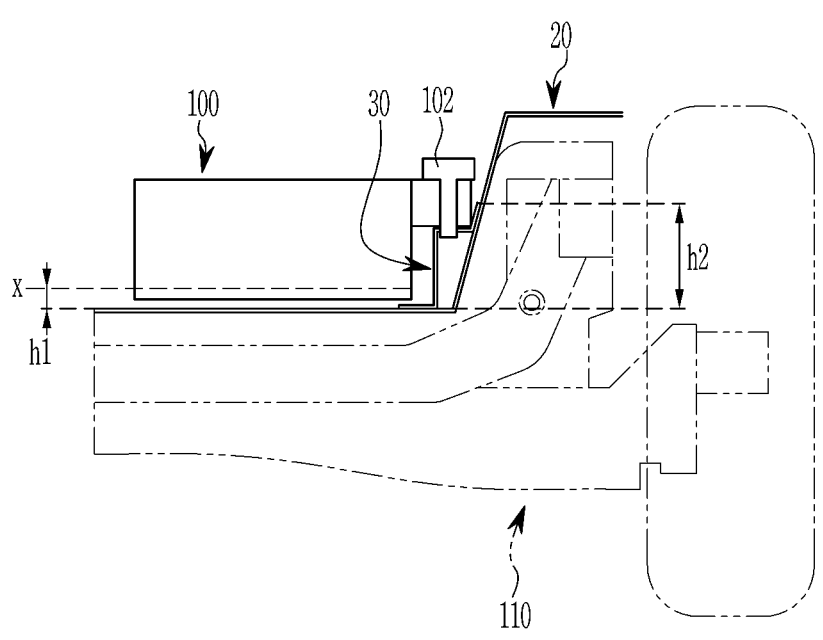
FIG. 11 is a drawing showing an example of mounting parts of a vehicle body rear structure according to an exemplary embodiment of the present invention.

FIG. 11 is a drawing showing an example of mounting parts of a vehicle body rear structure according to an exemplary embodiment of the present invention.

Referring to FIG. 11, the rear floor side member 30 is mounted on the upper portion of the rear floor panel 20, and rear mount parts 100, for example, high-weight autonomous driving parts, may be mounted on the rear floor side member 30. As shown in the drawing, the rear mount parts 100 may be mounted using mount bolts 102 and may also be mounted through a separate bracket, thereby increasing the utilization of indoor space.

Compared to a vehicle in which the rear floor side member, which is a general structure, is mounted on the lower part of the rear floor panel, in the vehicle body rear structure according to an exemplary embodiment, restrictions on interference with the vehicle body lower configuration 110, for example, chassis parts such as a frame or suspension system, are reduced, and the installation height of the rear floor panel 20 may be lowered h1 (based on the relative height X of the rear floor side member, which is a general structure). Accordingly, it is possible to secure more cargo loading space in the height direction of the vehicle body. In addition, since the mass center of the vehicle body and cargo may be lowered, stable behavior of the vehicle is possible.

In addition, since the height direction design degree of freedom of the rear floor side member 30 is increased, the height direction cross-section coefficient of the rear floor side member 30 may be increased h2, so vehicle strength may be increased.

As described above, according to the vehicle body rear structure according to an exemplary embodiment, crash response performance at the rear of the vehicle body may be enhanced and an indoor space at the rear of the vehicle body may be secured.

In addition, according to the vehicle body rear structure according to an exemplary embodiment, the rear floor side member may be used as a configuration for mounting parts at the rear of the vehicle body.

While embodiments of the invention have been described in connection with what are presently considered to be practical exemplary embodiments, it is to be understood that the embodiments of the invention are not limited to the disclosed embodiments. On the contrary, they are intended to cover various modifications and equivalent arrangements included within the spirit and scope of the appended claims.

What is claimed is:

1. A rear structure for a vehicle body, the rear structure comprising:
   a rear floor panel;
   a rear floor side member mounted on both sides of an upper portion of the rear floor panel along a length direction of the vehicle body and defining a side closed section together with the rear floor panel;
   a cross member disposed in a width direction of the vehicle body and connected with a front of the rear floor side member; and
   a center floor panel, wherein a part of the center floor panel is inserted between the cross member and the rear floor panel, wherein the cross member comprises a cross lower flange and a cross upper flange connected to the center floor panel, and the cross member and the center floor panel define a cross closed section between the cross lower flange and the cross upper flange.

2. The rear structure of claim 1, wherein the rear floor panel comprises a rear floor front flange configured to be welded integrally with the cross lower flange and the center floor panel at a front portion corresponding to the cross lower flange.

3. The rear structure of claim 2, wherein the rear floor panel further comprises a rear floor bent portion bent toward the cross lower flange.

4. The rear structure of claim 1, wherein the rear floor side member comprises a side member front flange configured to be integrally welded with the cross upper flange and the center floor panel at a position corresponding to the cross upper flange at a front portion thereof.

5. The rear structure of claim 4, wherein the rear floor side member further comprises a rear side member bent portion bent toward the cross upper flange.

6. The rear structure of claim 1, further comprising a rear wheel arch member connected to an end of the cross member and provided on both sides of the vehicle body, respectively.

7. The rear structure of claim 6, further comprising a side sill connected to a front of the rear wheel arch member and the center floor panel and provided on both sides of the vehicle body, respectively.

8. A vehicle comprising:
a vehicle body;
a rear floor panel at a rear of the vehicle body;
a rear floor side member mounted on both sides of an upper portion of the rear floor panel along a length direction of the vehicle body and defining a side closed section together with the rear floor panel, wherein the rear floor side member comprises:
a side member lower flange; and
a side member upper flange;
a cross member disposed in a width direction of the vehicle body and connected with a front of the rear floor side member, wherein the cross member comprises a cross lower flange and a cross upper flange connected to the center floor panel; and
a center floor panel, wherein a part of the center floor panel is inserted between the cross member and the rear floor panel, wherein the cross member and the center floor panel define a cross closed section between the cross lower flange and the cross upper flange.

9. The vehicle of claim 8, further comprising:
a back panel connected with a rear of the rear floor side member;
a chamfer provided at a rear of the rear floor panel toward an inside of the vehicle body; and
a side member rear flange disposed at the rear of the rear floor side member, wherein the chamfer, the side member rear flange, and the back panel are integrally welded.

10. The vehicle of claim 8, wherein the rear floor panel comprises:
a rear floor front flange configured to be welded integrally with the cross lower flange and the center floor panel at a front portion corresponding to the cross lower flange; and
a rear floor bent portion bent toward the cross lower flange.

11. The vehicle of claim 10, wherein the rear floor side member comprises:
a side member front flange configured to be integrally welded with the cross upper flange and the center floor panel at a position corresponding to the cross upper flange at a front portion thereof; and
a rear side member bent portion bent toward the cross upper flange.

12. The vehicle of claim 8, further comprising a rear wheel arch member connected to an end of the cross member and provided on both sides of the vehicle body, respectively.

13. The vehicle of claim 12, further comprising a side sill connected to a front of the rear wheel arch member and the center floor panel and provided on both sides of the vehicle body, respectively.

14. A vehicle comprising:
a vehicle body;
a rear floor panel at a rear of the vehicle body;
a rear floor side member mounted on both sides of an upper portion of the rear floor panel along a length direction of the vehicle body and defining a side closed section together with the rear floor panel;
a cross member disposed in a width direction of the vehicle body and connected with a front of the rear floor side member; and
a center floor panel, wherein a part of the center floor panel is inserted between the cross member and the rear floor panel, wherein the cross member comprises a cross lower flange and a cross upper flange connected to the center floor panel, and the cross member and the center floor panel define a cross closed section between the cross lower flange and the cross upper flange.

15. The vehicle of claim 14, wherein the rear floor panel comprises a rear floor front flange configured to be welded integrally with the cross lower flange and the center floor panel at a front portion corresponding to the cross lower flange.

16. The vehicle of claim 15, wherein the rear floor panel further comprises a rear floor bent portion bent toward the cross lower flange.

17. The vehicle of claim 14, wherein the rear floor side member comprises a side member front flange configured to be integrally welded with the cross upper flange and the center floor panel at a position corresponding to the cross upper flange at a front portion thereof.

18. The vehicle of claim 17, wherein the rear floor side member further comprises a rear side member bent portion bent toward the cross upper flange.

19. The vehicle of claim 14, further comprising a rear wheel arch member connected to an end of the cross member and provided on both sides of the vehicle body, respectively.

20. The vehicle of claim 19, further comprising a side sill connected to a front of the rear wheel arch member and the center floor panel and provided on both sides of the vehicle body, respectively.

* * * * *